(12) United States Patent
Lee (10) Patent No.: US 8,562,198 B2
(45) Date of Patent: Oct. 22, 2013

(54) OPTICAL MEMBER AND DISPLAY DEVICE

(75) Inventor: Jin Ho Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 151 days.

(21) Appl. No.: 13/249,334

(22) Filed: Sep. 30, 2011

(65) Prior Publication Data
US 2012/0113618 A1    May 10, 2012

(30) Foreign Application Priority Data

Nov. 4, 2010    (KR) .................. 10-2010-0109457

(51) Int. Cl.
*F21V 7/04*    (2006.01)

(52) U.S. Cl.
USPC ............... 362/621; 362/84; 362/612

(58) Field of Classification Search
USPC .............. 362/84, 311.02, 612–613, 621–622, 362/627–629, 800
See application file for complete search history.

(56) References Cited

FOREIGN PATENT DOCUMENTS

| JP | 2007-149665 A | 6/2007 |
|---|---|---|
| KR | 10-2006-0024527 A | 3/2006 |
| KR | 10-2009-0060717 A | 6/2009 |

OTHER PUBLICATIONS

Notice of Allowance dated Feb. 28, 2012 in Korean Application No. 10-2010-0109457, filed Nov. 4, 2010.

*Primary Examiner* — Jason Moon Han
(74) *Attorney, Agent, or Firm* — Saliwanchik, Lloyd & Eisenschenk (57) ABSTRACT

Disclosed are an optical member and a display device. The display device includes a light source, a plurality of wavelength conversion particles to convert a wavelength of a light emitted from the light source, a receptacle receiving the wavelength conversion particles and having a protrusion on an inner surface thereof, a sealing part inserted into the receptacle to seal an inner part of the receptacle, and a display panel to display an image by receiving a light converted by the wavelength conversion particles.

15 Claims, 8 Drawing Sheets

OPTICAL MEMBER AND DISPLAY DEVICE

This application claims to the benefit of Korean Patent Application No. 10-2010-0109457, filed on Nov. 4, 2010, which is hereby incorporated by reference in its entirety.

BACKGROUND

The embodiment relates to an optical member and a display device including the same.

An LED (Light Emitting Diode) is a semiconductor device to convert electricity into UV light, visible light, or infrared light based on the characteristic of a compound semiconductor. The LED has been mainly used in a home appliance, a remote control, and a large electronic display board.

A high-brightness LED light source has been used as a lightening lamp. Since the high-brightness LED represents high energy efficiency and has a long life span, the replacement cost for the LED is small. In addition, since the LED strongly withstands vibration or impacts and does not require toxic material such as mercury, the LED has advantages in terms of energy conservation, the protection of environment, and cost reduction. Accordingly, the LED has been used instead of an existing light bulb or fluorescence lamp.

Especially, the LED has a great advantage when the LED is used as a light source for a middle or large scale LCD TV or monitor. Recently, prototypes employing the LEDs have been mass-produced since the LED can represent the superior degree of color purity and lower power consumption and can be easily realized in small size when comparing with a CCFL (Cold Cathode Fluorescent Lamp) mainly used in an LCD (Liquid Crystal Display), and the researches and studies on the LCD have been more actively performed.

Recently, a plurality of technologies are introduced to realize white light by employing a blue LED and using quantum dots to emit red and green light as a fluorescence substance. This is because the white light realized by using the quantum dots represents high brightness and superior color reproduction.

However, there still remains the requirement for researches and studies to reduce light loss and improve color uniformity when the LED is applied to a backlight unit.

BRIEF SUMMARY

According to the embodiment, there is provided a display device including a light source, a plurality of wavelength conversion particles to convert a wavelength of a light emitted from the light source, a receptacle receiving the wavelength conversion particles and having a protrusion on an inner surface thereof, a sealing part inserted into the receptacle to seal an inner part of the receptacle, and a display panel to display an image by receiving a light converted by the wavelength conversion particles.

According to the embodiment, there is provided an optical member including a receptacle provided on an inner surface thereof with a protrusion, a plurality of wavelength conversion particles provided in the receptacle to convert a wavelength of an incident light, and a sealing part inserted into the receptacle, making contact with the protrusion, and sealing an inner part of the receptacle.

According to the embodiment, there is provided a display device including a light source, a wavelength conversion member to convert a wavelength of a light emitted from the light source, and a display panel onto which a light output from the wavelength conversion member is incident. The wavelength conversion member includes a plurality of wavelength conversion particles to convert the wavelength of the light emitted from the light source, a receptacle to receive the wavelength conversion particles and provided on an inner surface thereof with a groove, and a sealing part provided in the receptacle.

DETAILED DESCRIPTION

The embodiment provides a wavelength conversion member having high reliability and improved chemical resistance and a displace device including the same.

The display device according to the embodiment includes a light source, a plurality of wavelength conversion particles to convert a wavelength of a light emitted from the light source, a receptacle receiving the wavelength conversion particles and having a protrusion on an inner surface thereof, a sealing part inserted into the receptacle to seal an inner part of the receptacle, and a display panel to display an image by receiving a light converted by the wavelength conversion particles.

An optical member according to the embodiment includes a receptacle provided on an inner surface thereof with a protrusion, a plurality of wavelength conversion particles provided in the receptacle to convert a wavelength of an incident light, and a sealing part inserted into the receptacle, making contact with the protrusion, and sealing an inner part of a tube.

The display device according to the embodiment includes a light source, a wavelength conversion member to convert a wavelength of a light emitted from the light source, and a display panel onto which a light output from the wavelength conversion member is incident. The wavelength conversion member includes a plurality of wavelength conversion particles to convert the wavelength of the light emitted from the light source, a receptacle to receive the wavelength conversion particles and provided on an inner surface thereof with a groove, and a sealing part provided in the receptacle.

The optical member according to the embodiment includes a protrusion formed on an inner surface of the receptacle. In addition, the sealing part may make contact with the protrusion. Accordingly, the contact area between the sealing part and the receptacle is increased, and the sealing part can firmly adhere to the inner surface of the receptacle.

Especially, the sealing part firmly seals the inner part of the receptacle. Accordingly, the wavelength conversion particles can be effectively protected from chemical penetration of external moisture or external oxygen.

In addition, the protrusion can define an internal region provided therein with wavelength conversion particles and an end region provided therein with the sealing part. Especially, the protrusion can limit the arrangement region of the sealing part. In addition, the protrusion can reduce the size of the inlet of the internal region.

Accordingly, the optical member according to the embodiment can easily protect the wavelength conversion particles from moisture or oxygen, and can represent improved chemical resistance.

In addition, the display device according to the embodiment can represent improved reliability and improved image quality.

In the description of the embodiments, it will be understood that when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings. The thickness and size of each layer shown in the drawings may be exaggerated, omitted or schematically drawn for the purpose of convenience or clarity. In addition, the size of elements does not utterly reflect an actual size.

Figure 1:
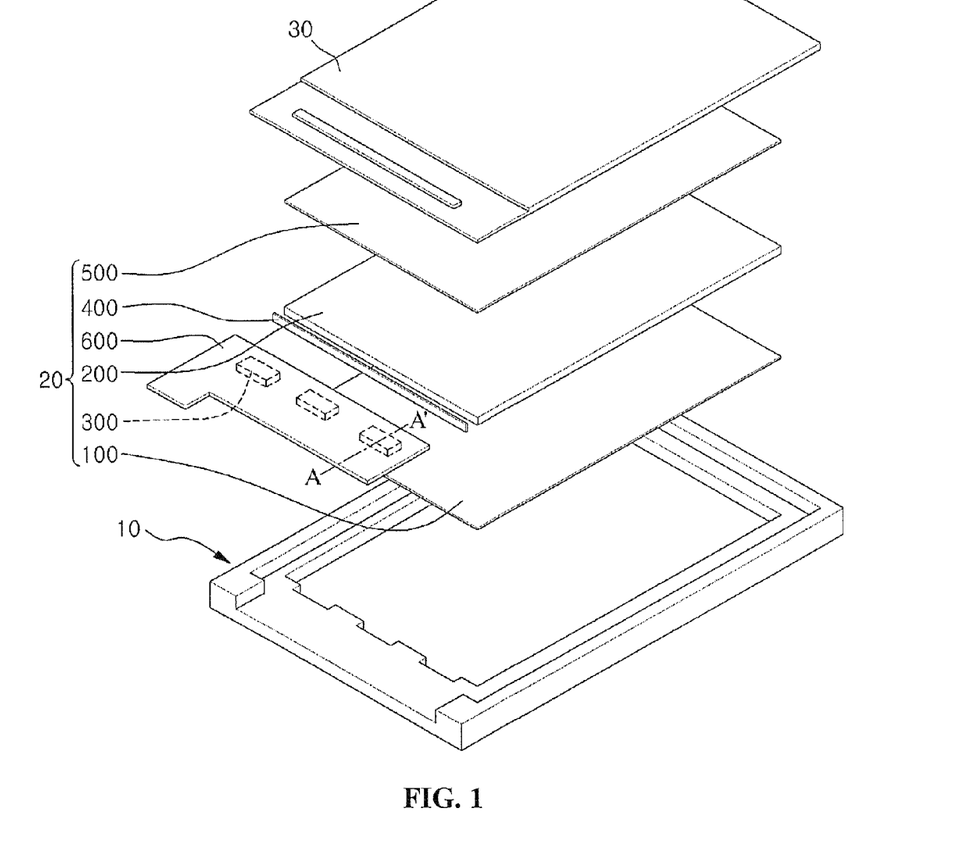
FIG. 1 is an exploded perspective view showing a liquid crystal display according to a first embodiment.
Figure 2:
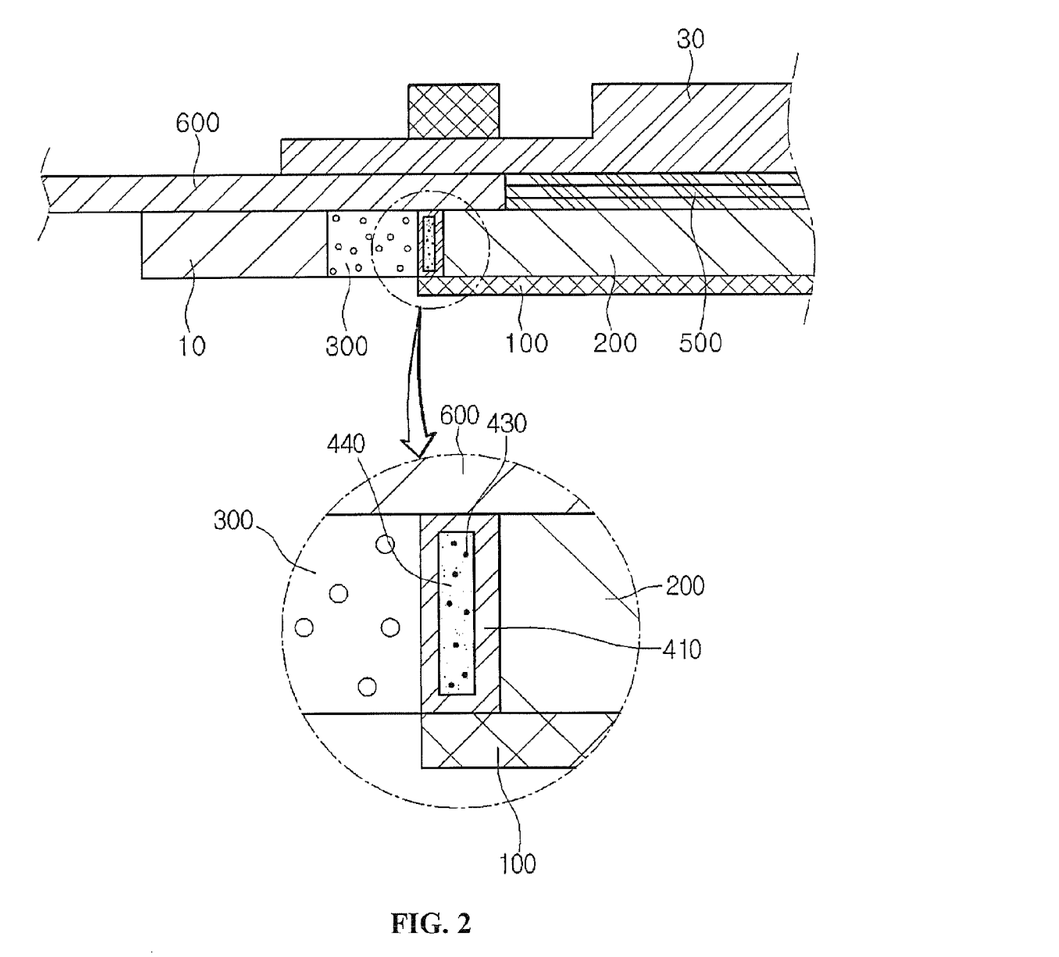
FIG. 2 is a sectional view taken along line A-A' of FIG. 1.
Figure 3:
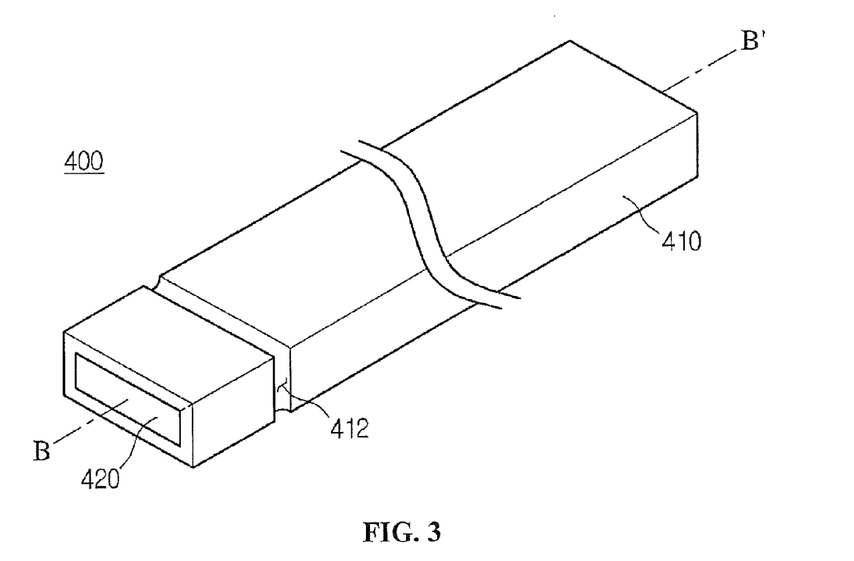
FIG. 3 is a perspective view showing a wavelength conversion member according to the first embodiment.
Figure 4:
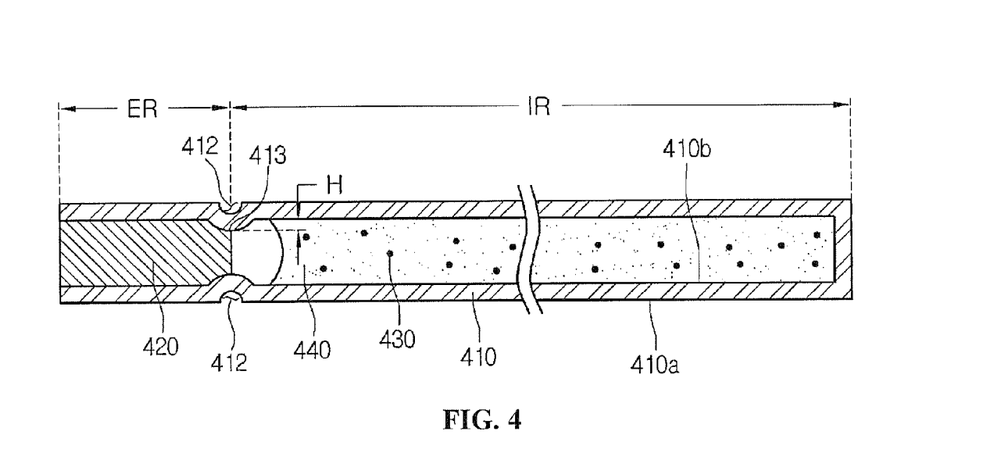
FIG. 4 is a sectional view taken along line B-B' of FIG. 3.

FIG. 1 is an exploded perspective view showing an LCD (Liquid Crystal Display) according to a first embodiment, and FIG. 2 is a sectional view taken along line A-A' of FIG. 1. FIG. 3 is a perspective view showing a wavelength conversion member according to the first embodiment, and FIG. 4 is a sectional view taken along line B-B' of FIG. 3. FIGS. 5 to 8 are views showing the manufacturing process of the wavelength conversion member according to the first embodiment.

Referring to FIGS. 1 to 4, the LCD according to the embodiment includes a mold frame 10, a backlight assembly 20, and a liquid crystal panel 30.

The mold frame 10 receives the backlight assembly 20 and the liquid crystal panel 30 therein. The mold frame 10 has the shape of a rectangular frame. The mold frame 10 may include plastic or reinforced plastic.

In addition, a chassis may be disposed under the mold frame 10 to surround the mold frame 10 while supporting the backlight assembly 20. The chassis may be disposed at a lateral surface of the mold frame 10.

The backlight assembly 20 is disposed inside the mold frame 10 to emit light toward the liquid crystal panel 30. The backlight assembly 20 includes a reflective sheet 100, a light guide plate 200, light emitting diodes 300, a wavelength conversion member 400, a plurality of optical sheets 500, and a flexible printed circuit board (FPCB) 600.

The reflective sheet 100 reflects light emitted from the light emitting diodes 300 upward.

The light guide plate 200 is disposed on the reflective sheet 100 to guide the light, which is emitted from the light emitting diodes 300, upward by reflecting, refracting and scattering the light incident thereto from the light emitting diodes 300.

The light guide plate 200 includes an incident surface directed toward the light emitting diodes 300. From among lateral sides of the light guide plate 200, a lateral side directed toward the light emitting diodes 300 may serve as the incident surface.

The light emitting diodes 300 are disposed at the lateral side of the light guide plate 200. In detail, the light emitting diodes 300 are disposed at the incident surface.

The light emitting diodes 300 serve as a light source for generating the light. In detail, the light emitting diodes 300 emit the light toward the wavelength conversion member 400.

The light emitting diodes 300 may include a blue light emitting diode generating the blue light or a UV light emitting diode generating the UV light. In detail, the light emitting diodes 300 can emit the blue light having the wavelength band of about 430 nm to about 470 nm or the UV light having the wavelength band of about 300 nm to about 400 nm.

The light emitting diodes 300 are mounted on the FPCB 600. The light emitting diodes 300 may be disposed under the FPCB 600. The light emitting diodes 300 are driven by receiving a driving signal through the FPCB 600.

The wavelength conversion member 400 is interposed between the light emitting diodes 300 and the light guide plate 200. In detail, the wavelength conversion member 400 is bonded to the lateral side of the light guide plate 200. In more detail, the wavelength conversion member 400 is attached to the incident surface of the light guide plate 200. In addition, the wavelength conversion member 400 can be bonded to the light emitting diodes 300.

The wavelength conversion member 400 receives the light from the light emitting diodes 300 to convert the wavelength of the light. For instance, the wavelength conversion member 400 may convert the blue light emitted from the light emitting diodes 300 into the green light and the red light. In detail, the wavelength conversion member 400 may convert a part of the blue light into the green light having the wavelength in the range of about 520 nm to about 560 nm, and a part of the blue light into the red light having the wavelength in the range of about 630 nm to about 660 nm.

In addition, the wavelength conversion member 400 may convert the UV light emitted from the light emitting diodes 300 into the blue light, the green light and the red light. In detail, the wavelength conversion member 400 may convert a part of the UV light into the blue light having the wavelength in the range of about 430 nm to about 470 nm, a part of the UV light into the green light having the wavelength in the range of about 520 nm to about 560 nm, and a part of the UV light into the red light having the wavelength in the range of about 630 nm to about 660 nm.

Therefore, the white light can be generated by the light passing through the wavelength conversion member 400 and the lights converted by the wavelength conversion member 400. In detail, the white light can be incident into the light guide plate 200 through the combination of the blue light, the green light and the red right.

As shown in FIGS. 3 and 4, the wavelength conversion member 400 includes a tube 410, a sealing part 420, a plurality of wavelength conversion particles 430, and a matrix 440.

The tube 410 receives the sealing part 420, the wavelength conversion particles 430 and the matrix 440 therein. That is, the tube 410 may serve as a receptacle to receive the sealing part 420, the wavelength conversion particles 430 and the matrix 440. In addition, the tube 410 extends in one direction with a long length.

The tube 410 may have the shape of a pipe. In detail, a section of the tube 410, which is vertical to the length direction of the tube 410, may have the rectangular shape. The tube 410 may have a width of about 0.6 mm and a height of about 0.2 mm. In other words, the tube 410 may include a capillary tube.

A protrusion 411 is formed on an inner surface of the tube 410. In detail, the protrusion 411 is formed on an end portion of the inner surface of the tube 410. In more detail, the protrusion 411 is formed on an open end portion of the tube 410.

The protrusion 411 may have the shape of a closed loop. The protrusion 411 may protrude about 0.1 mm to about 0.2 mm from the inner surface of the tube 410. In other words, a height H of the protrusion 411 may be in the range of about 0.1 mm to about 0.2 mm. In addition, a groove 412 is formed in an outer surface of the tube 410 corresponding to the protrusion 411. In this case, the depth of the groove 412 may correspond to the height H of the protrusion 411.

The tube 410 is divided into an internal region IR and an end region ER by the protrusion 411. In other words, the tube 410 includes the internal region IR and the end region ER. In detail, the protrusion 411 is formed at the boundary region between the internal region IR and the end region ER.

The inlet of the internal region IR is narrow by the protrusion 411. In other words, since the protrusion 411 protrudes from the inner surface of the tube 410, the inlet provided between the internal region IR and the end region ER is narrow. In detail, the inlet of the internal region IR is narrower than an inner part of the tube 410.

The tube 410 is transparent. The tube 410 may include glass. In detail, the tube 410 may include a glass capillary tube.

The sealing part 420 is provided inside the tube 410. The sealing part 420 is provided at the end portion of the tube 410. The sealing part 420 seals the inner part of the tube 410. The sealing part 420 may include epoxy resin.

In addition, the sealing part 420 is provided at the end region ER. The sealing part 420 may directly make contact with the protrusion 411. In more detail, the sealing part 420 may make contact with a part of the surface of the protrusion 411. In other words, the sealing part 420 may cover the protrusion 411.

In addition, the sealing part 420 may be provided in a portion of the internal region IR, and may cover the whole portion of the protrusion 411.

Since the sealing part 420 makes contact with the protrusion 411, the contact area between the sealing part 420 and the tube 410 is increased. Therefore, the sealing part 420 can more firmly seal the inner part of the tube 410.

The wavelength conversion particles 430 are contained in the tube 410. In detail, the wavelength conversion particles 430 are uniformly distributed into the matrix 440, and the matrix 440 is disposed inside the tube 410.

The wavelength conversion particles 430 convert the wavelength of the light emitted from the light emitting diodes 300. In detail, the light is incident into the wavelength conversion particles 430 from the light emitting diodes 300 and the wavelength conversion particles 430 convert the wavelength of the incident light. For instance, the wavelength conversion particles 430 may convert the blue light emitted from the light emitting diodes 300 into the green light and the red light. That is, a part of the wavelength conversion particles 430 may convert the blue light into the green light having the wavelength in the range of about 520 nm to about 560 nm and a part of the wavelength conversion particles 430 converts the blue light into the red light having the wavelength in the range of about 630 nm to about 660 nm.

In addition, the wavelength conversion particles 430 can convert the UV light emitted from the light emitting diodes 300 into the blue light, the green light and the red light. That is, a part of the wavelength conversion particles 430 converts the UV light into the blue light having the wavelength in the range of about 430 nm to about 470 nm, and a part of the wavelength conversion particles 430 converts the UV light into the green light having the wavelength in the range of about 520 nm to about 560 nm. Further, a part of the wavelength conversion particles 430 converts the UV light into the red light having the wavelength in the range of about 630 nm to about 660 nm.

In other words, if the light emitting diodes 300 are blue light emitting diodes that emit the blue light, the wavelength conversion particles 430 capable of converting the blue light into the green light and the red light may be employed. In addition, if the light emitting diodes 300 are UV light emitting diodes that emit the UV light, the wavelength conversion particles 430 capable of converting the UV light into the blue light, the green light and the red light may be employed.

The wavelength conversion particles 430 may include a plurality of quantum dots. The quantum dots may include core nano-crystals and shell nano-crystals surrounding the core nano-crystals. In addition, the quantum dots may include organic ligands bonded to the shell nano-crystals. In addition, the quantum dots may include an organic coating layer surrounding the shell nano-crystals.

The shell nano-crystals may be prepared as at least two layers. The shell nano-crystals are formed on the surface of the core nano-crystals. The quantum dots can lengthen the wavelength of the light incident into the core nano-crystals by using the shell nano-crystals forming a shell layer, thereby improving the light efficiency.

The quantum dots may include at least one of a group-II compound semiconductor, a group-III compound semiconductor, a group-V compound semiconductor, and a group-VI compound semiconductor. In more detail, the core nano-crystals may include CdSe, InGaP, CdTe, CdS, ZnSe, ZnTe, ZnS, HgTe or HgS. In addition, the shell nano-crystals may include CuZnS, CdSe, CdTe, CdS, ZnSe, ZnTe, ZnS, HgTe or HgS. The quantum dot may have a diameter of about 1 nm to about 10 nm.

The wavelength of the light emitted from the quantum dots can be adjusted according to the size of the quantum dot or the molar ratio between the molecular cluster compound and the nano-particle precursor in the synthesis process. The organic ligand may include pyridine, mercapto alcohol, thiol, phosphine and phosphine oxide. The organic ligand may stabilize the unstable quantum dots after the synthesis process. Dangling bonds may be formed at the valence band and the quantum dots may be unstable due to the dangling bonds. However, since one end of the organic ligand is the non-bonding state, one end of the organic ligand is bonded with the dangling bonds, thereby stabilizing the quantum dots.

In particular, if the size of the quantum dot is smaller than the Bohr radius of an exciton, which consists of an electron and a hole excited by light and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent wavelength of the quantum dot may vary depending on the size of the particles. In detail, the light has the shorter wavelength as the size of the particle becomes small, so the fluorescent light having the wavelength band of visible ray can be generated by adjusting the size of the particles. In addition, the quantum dot represents the extinction coefficient, which is 100 to 1000 times higher than that of the general fluorescent pigment, and has the superior quantum yield as compared with the general fluorescent pigment, so that that strong fluorescent light can be generated.

The quantum dots can be synthesized through the chemical wet scheme. The chemical wet scheme is to grow the particles by immersing the precursor material in the organic solvent. According to the chemical wet scheme, the quantum dots can be synthesized.

The matrix 440 surrounds the wavelength conversion particles 430. In detail, the wavelength conversion particles 430 are uniformly distributed in the matrix 440. The matrix 440 includes polymer. The matrix 440 is transparent. That is, the matrix 440 includes transparent polymer.

The matrix 440 is disposed in the tube 410. In detail, the matrix 440 is fully filled in the tube 410. The matrix 440 may adhere to an inner surface of the tube 410.

An air layer 450 is formed between the wavelength conversion part 420 and the matrix 440. The air layer 450 is filled with nitrogen. The air layer 450 performs the damping function between the wavelength conversion part 420 and the matrix 440.

The wavelength conversion particles 430, the matrix 440, and the air layer 450 are provided in the internal region IR. In other words, the wavelength conversion particles 430, the matrix 440, and the air layer 450 are provided in the inner part of the tube 410 sealed by the sealing part 420.

FIGS. 5 to 8 are views showing the manufacturing process of the wavelength conversion member 400. As shown in FIGS. 5 to 8, the wavelength conversion member 400 may be formed through the following scheme.

Figure 5:
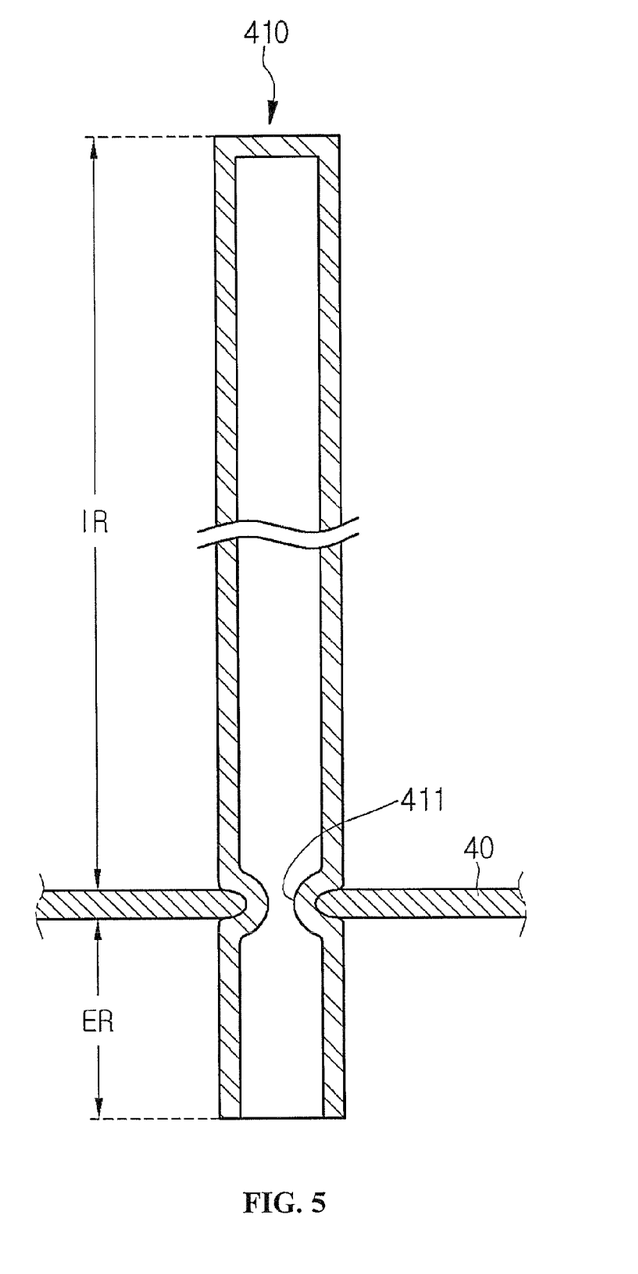
FIGS. 5 to 8 are views showing the procedure of manufacturing a wavelength conversion member according to the first embodiment.

Referring to FIG. 5, the end portion of the tube 410 is heated, so that the end portion of the tube 410 can be softened. The softened end portion of the tube 410 is pressurized by a blade 40. Therefore, the protrusion 411 is formed on the inner surface of the tube 410, and the groove 412 is formed in the outer surface of the tube 410.

In the contact with the blade 40, the tube 410 may rotate. Accordingly, the protrusion 411 and the groove 412 may have the shape of a closed loop.

Figure 6:
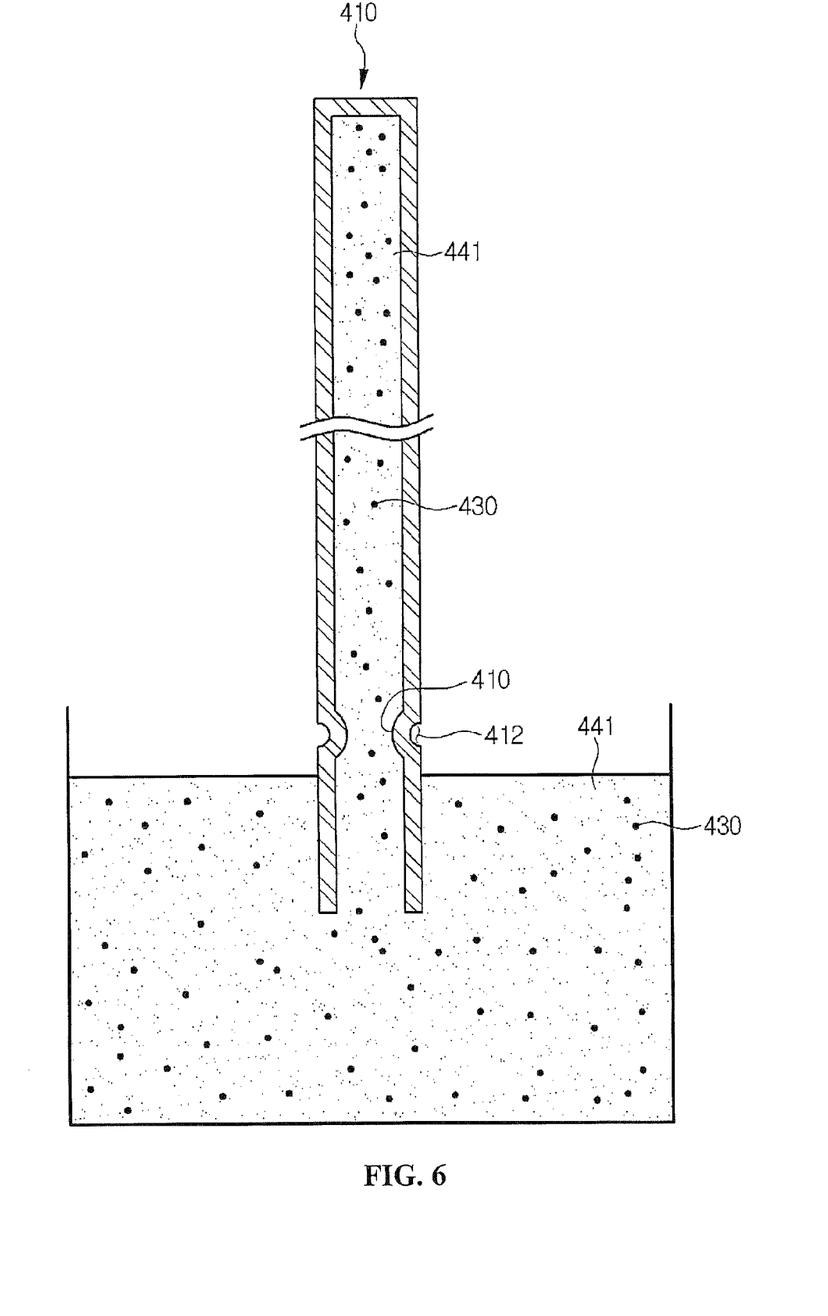

Referring to FIG. 6, the wavelength conversion particles 430 are distributed in a resin composition 441. The resin composition 441 is transparent. The resin composition 441 may have a light curing characteristic.

Thereafter, the internal pressure of the tube 410 having the protrusion 411 serving as a scattering pattern is reduced, the inlet of the tube 410 is put in the resin composition 441 having the wavelength conversion particles 430 distributed therein, and the surrounding pressure is increased. Therefore, the resin composition 441 having the wavelength conversion particles 430 distributed therein is introduced into the tube 410.

Figure 7:
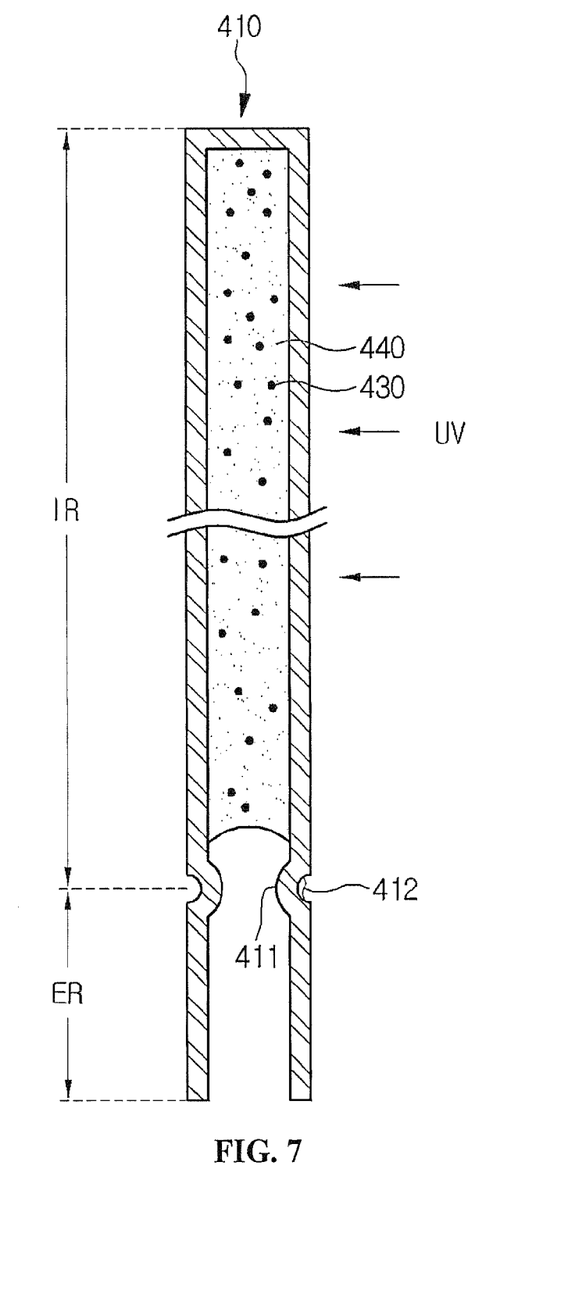

Referring to FIG. 7, a portion of the resin composition 441 introduced into the tube 410 is removed, so that the inlet of the tube 410 becomes empty. Thereafter, the resin composition 441 introduced into the tube 410 is cured by UV light, so that the matrix 440 is formed.

Figure 8:
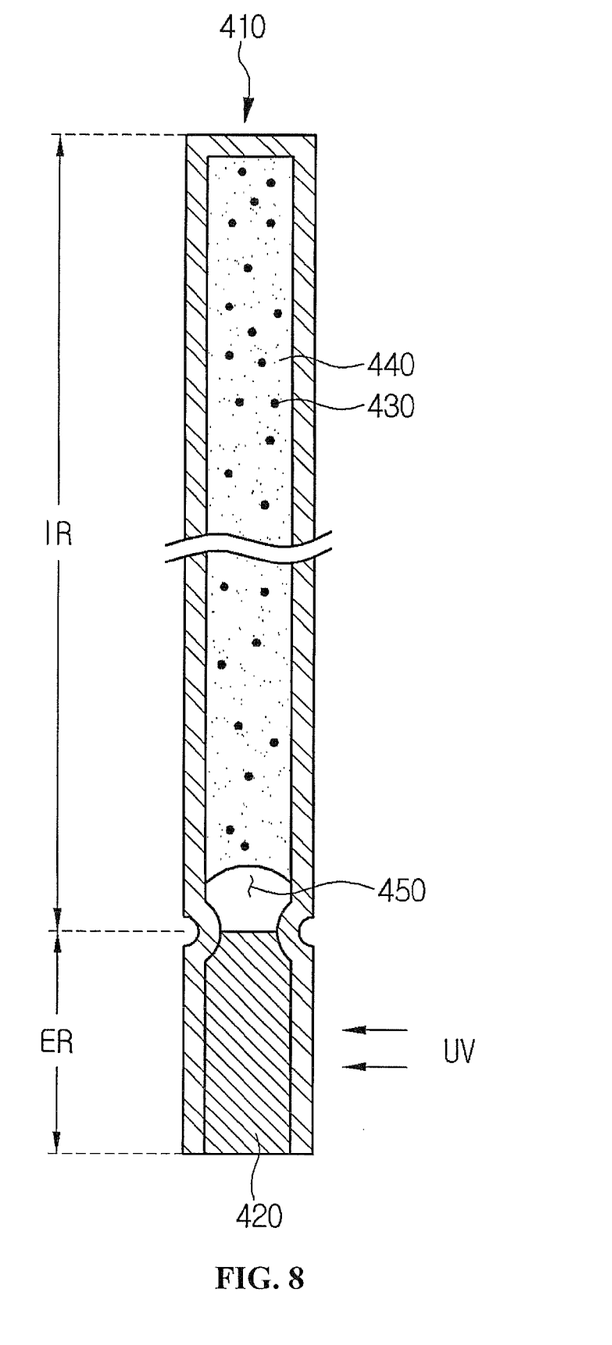

Referring to FIG. 8, epoxy resin is introduced into the inlet of the tube 410. In this case, the protrusion 411 can serve as a stopper when the epoxy resin composition is introduced into the tube 410. In other words, the epoxy resin composition may be introduced into only the end region ER by the protrusion 411.

Thereafter, the epoxy resin composition is cured, so that the sealing part 420 is formed. The sealing part 420 is formed under a nitrogen atmosphere. Accordingly, the air layer 450 including nitrogen may be formed between the sealing part 420 and the matrix 440.

Referring to FIGS. 1 to 4, the optical sheets 500 are disposed on the light guide plate 200 to improve the characteristic of the light passing through the optical sheets 500.

The FPCB 600 is electrically connected to the light emitting diodes 300. The FPCB 600 can mount the light emitting diodes 300 thereon. The FPCB 600 is installed in the mold frame 10 and arranged on the light guide plate 200.

The mold frame 10 and the backlight assembly 20 constitute the backlight unit. That is, the backlight unit includes the mold frame 10 and the backlight assembly 20.

The liquid crystal panel 30 is provided inside the mold frame 10, and provided on the optical sheets 500.

The liquid crystal panel 30 displays images by adjusting intensity of the light passing through the liquid crystal panel 30. That is, the liquid crystal panel 30 is a display panel to display the images. The liquid crystal panel 30 displays an image by using light having wavelengths converted by the wavelength conversion member 400. The liquid crystal panel 30 includes a TFT substrate, a color filter substrate, a liquid crystal layer interposed between the above two substrate and polarizing filters.

As described above, the wavelength conversion member 400 includes the protrusion 411 formed on the inner surface of the tube 410. In addition, the sealing part may directly make contact with the protrusion 411. Therefore, the contact area between the sealing part and the tube 410 is increased, so that the sealing part can be firmly coupled with the inner surface of the tube 410.

In particular, the sealing part firmly seals the inner part of the tube 410. Therefore, the wavelength conversion particles 430 can be effectively protected from external chemical penetration of external moisture or external oxygen.

In particular, since the protrusion 411 can reduce the size of the inlet of the internal region IR, the wavelength conversion member 400 can easily protect the wavelength conversion particles 430 from moisture or oxygen, and can represent improved chemical resistance.

The LCD according to the embodiment can have improved reliability and improved image quality.

Figure 9:
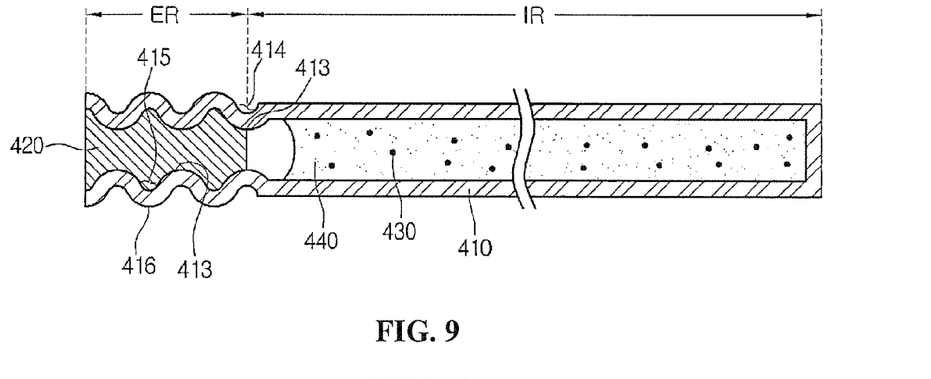
FIG. 9 is a sectional view showing a wavelength conversion member according to a second embodiment.
Figure 10:
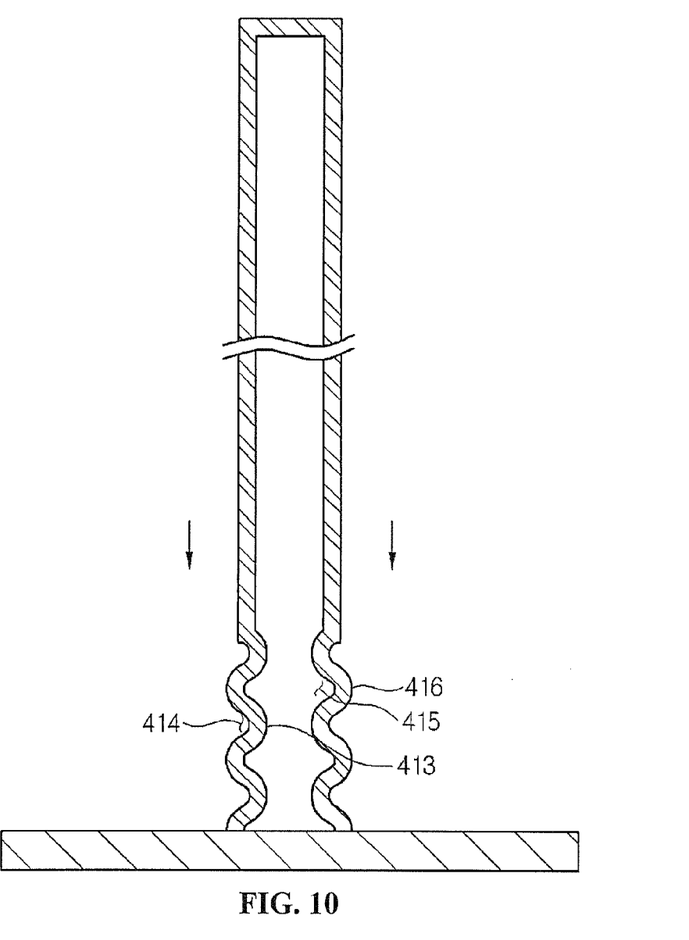
FIG. 10 is a view showing a procedure of forming a tube according to the second embodiment.

FIG. 9 is a sectional view showing a part of a wavelength conversion member according to the second embodiment. FIG. 10 is a view showing a process of forming a tube according to the second embodiment. The description of the previous embodiment will be incorporated in the description of the present embodiment by reference and the wavelength conversion member will be further described in the present embodiment. That is, the description about the LCD according to the previous embodiment will be incorporated in the description about the LCD according to the present embodiment.

As shown in FIG. 9, a plurality of first protrusions 413 are formed on the inner surface of the tube 410. In more detail, the first protrusions 413 are formed on the end portion of the tube 410.

In addition, a plurality of first grooves 415 are formed on the inner surface of the tube 410. In more detail, the first grooves 415 are formed on the end portion of the tube 410. The first grooves 415 and the first protrusions 413 are aligned alternately with each other.

The tube 410 may be divided into the internal region IR and the end region. ER by the first protrusions 413 and the first grooves 415. In other words, a region having the first protrusions 413 and the first grooves 415 may be the end region ER, and a region without the first protrusions 413 and the first grooves 415 may be the internal region IR.

A plurality of second grooves 414 may be formed on the outer surface of the tube 410 corresponding to the first protrusions 413. In addition, a plurality of second protrusions 416 may be formed on the outer surface of the tube 410 corresponding to the first grooves 415.

As shown in FIG. 10, the end portion of the tube 410 is heated, and then pressurized, so that the end portion of the tube 410 may be furrowed.

Accordingly, the first protrusions 413 and the first grooves 415 may be formed. In this case, the first protrusions 413 and the first grooves 415 may have the shape of a closed loop.

The sealing part 420 directly makes contact with the first protrusions 413 and the first grooves 415. The sealing part 420 can wholly cover the first protrusions 413. In other words, the sealing part 420 can directly make contact with the whole surfaces of the first protrusions 413. In addition, the sealing part 420 can be filled in the first groove 415. In addition, the sealing part 420 can directly make contact with inner surfaces of the first grooves 415.

Therefore, the contact area between the sealing part 420 and the tube 410 can be more improved. Accordingly, the sealing part 420 firmly seals the inner part of the tube 410, so that the wavelength conversion member 400 according to the present embodiment may have improved endurance and improved chemical resistance.

In addition, an LCD employing the wavelength conversion member 400 according to the present embodiment can represent improved reliability and improved image quality.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
    a light source;
    a wavelength conversion material to convert a wavelength of a light emitted from the light source;
    a receptacle only receiving the wavelength conversion material and having a protrusion on an inner surface thereof;
    a sealing part inserted into the receptacle to seal an inner part of the receptacle; and
    a display panel to display an image by receiving a light converted by the wavelength conversion material.

2. The display device of claim 1, wherein the sealing part directly makes contact with the protrusion.

3. The display device of claim 1, wherein the receptacle is divided into an internal region and an end region by the protrusion, and the sealing part is provided at the end region.

4. The display device of claim 1, wherein the receptacle is provided on an outer surface thereof with a groove corresponding to the protrusion.

5. The display device of claim 1, wherein the sealing part entirely covers the protrusion.

6. The display device of claim 1, wherein the sealing part partially covers the protrusion.

7. The display device of claim 1, wherein the protrusion has a closed loop shape.

8. The display device of claim 1, wherein the protrusion has a height in a range of about 0.1 mm to about 0.2 mm.

9. The display device of claim 1, wherein the sealing part directly makes contact with the protrusion.

10. A display device comprising:
    a light source;
    a wavelength conversion member to convert a wavelength of a light emitted from the light source; and
    a display panel onto which a light output from the wavelength conversion member is incident,
    wherein the wavelength conversion member comprises:
    a wavelength conversion material to convert the wavelength of the light emitted from the light source;
    a receptacle only receiving the wavelength conversion material and provided on an inner surface thereof with a groove; and
    a sealing part provided in the receptacle.

11. The display device of claim 10, wherein the sealing part is filled in the groove.

12. The display device of claim 10, wherein the receptacle is provided on an outer surface thereof with a protrusion corresponding to the groove.

13. The display device of claim 10, wherein the receptacle is provided on the inner surface thereof with a protrusion adjacent to the groove.

14. The display device of claim 13, wherein the sealing part directly makes contact with the protrusion.

15. The display device of claim 10, wherein the sealing part directly makes contact with an inner surface of the groove.

* * * * *